United States Patent [19]
Jericevich et al.

[11] Patent Number: 5,409,336
[45] Date of Patent: Apr. 25, 1995

[54] WALL ANCHORING APPARATUS

[76] Inventors: Anthony Jericevich, P.O. Box 459, Knysna 6570, South Africa; Robert G. Bevan, P.O. Box 395, Knysna, South Africa

[21] Appl. No.: 102,856
[22] Filed: Aug. 6, 1993
[51] Int. Cl.6 ................ F16B 13/04; F16B 13/06; F16B 21/00
[52] U.S. Cl. .................... 411/41; 411/48; 411/60; 411/344; 248/231.91
[58] Field of Search ............ 411/41, 45, 48, 60, 411/57, 344, 55; 248/231.2, 231.3, 231.91

[56] References Cited

U.S. PATENT DOCUMENTS

| | | | |
|---|---|---|---|
| 365,725 | 6/1987 | Buckland . | |
| 3,164,418 | 1/1965 | Biesecker . | |
| 3,282,547 | 11/1966 | Ables . | |
| 3,385,157 | 5/1968 | Rapata | 411/41 |
| 3,417,438 | 12/1968 | Schuplin . | |
| 3,918,130 | 11/1975 | Poe | 411/41 X |
| 4,085,651 | 4/1978 | Koscik | 411/41 X |
| 4,391,559 | 7/1983 | Mizusawa | 411/41 X |
| 4,398,317 | 8/1983 | Schubring | 411/41 X |
| 4,741,548 | 5/1988 | Schlanger | 411/41 X |
| 5,163,795 | 11/1992 | Benoit et al. | 411/48 X |

FOREIGN PATENT DOCUMENTS 1076504  7/1967  United Kingdom .............. 411/41

*Primary Examiner*—Neill R. Wilson
*Attorney, Agent, or Firm*—Hoffmann & Baron

[57] ABSTRACT

An anchor for suspending objects to a wall or ceiling is provided having a plunger held in position adjacent to a chamber, the plunger being inserted through the chamber where the plunger engages a plurality of wings, the wings thereby flare outward to secure the anchor within the support structure.

7 Claims, 3 Drawing Sheets

WALL ANCHORING APPARATUS

BACKGROUND OF THE INVENTION

The present invention is directed towards a wall anchoring and attachment apparatus for use with a hollow wall or similar structures. It is known in the prior art to provide anchors which require a separate anchor to be installed in a pilot hole. Insertion of a separate screw then causes the anchor to expand.

While the anchors represented in the prior art are sufficient for their intended purpose, there is room for improvement and variation in providing easier and more reliable anchor apparatuses.

SUMMARY OF THE INVENTION

It is an object of this invention to provide a unitary wall anchor apparatus for use with hollow walls or similar structures.

It is a further object of this invention to provide a unitary wall anchoring apparatus which is molded.

It is still a further and more particular object of this invention to provide a wall anchoring apparatus having a plunger attached at one end of an orifice which, when engaged, directs oppositely disposed wings to force the wings outwardly.

It is still a further and more particular object of this invention to provide an anchoring apparatus which is suitable for use within solid materials such as wood, brick, and concrete.

It is still a further and more particular object of this invention to provide an improved fastener for attaching both similar and dissimilar materials together.

It is still a further and more particular object of this invention to provide an improved fastener which is tamper resistant.

In accordance with this invention, these as well as other objects are provided by a wall anchoring apparatus having a platform with a front and a back, the platform defining an orifice which traverses the platform; a plunger attached at a first end to the platform front, the first end in opposite alignment to the orifice; a circumferencial collar, the collar carried by the platform back, an inner circumference of the collar in axial alignment with the orifice; a plurality of wings carried by the collar, each wing further defining a projection along an inner wing surface; wherein when the plunger is forcibly struck, the plunger is inserted through the orifice and the collar, the first end of the plunger further engaging each wing projection thereby forcing the plurality of wings to spread outwardly.

DETAILED DESCRIPTION

In accordance with this invention, it has been found that a wall anchoring apparatus can be provided which has a unitary construction which simplifies the use of the anchor and offers advantages over anchors described in the prior art. The wall anchor of the present invention can be readily supplied by injection molding from nylon or plastic, has a slim and ornamental profile, is easily installed by consumers and offers a variety of applications for wall hooks, curtain and drapery hardware, as well as shelving and cabinet assemblies.

Figure 1:
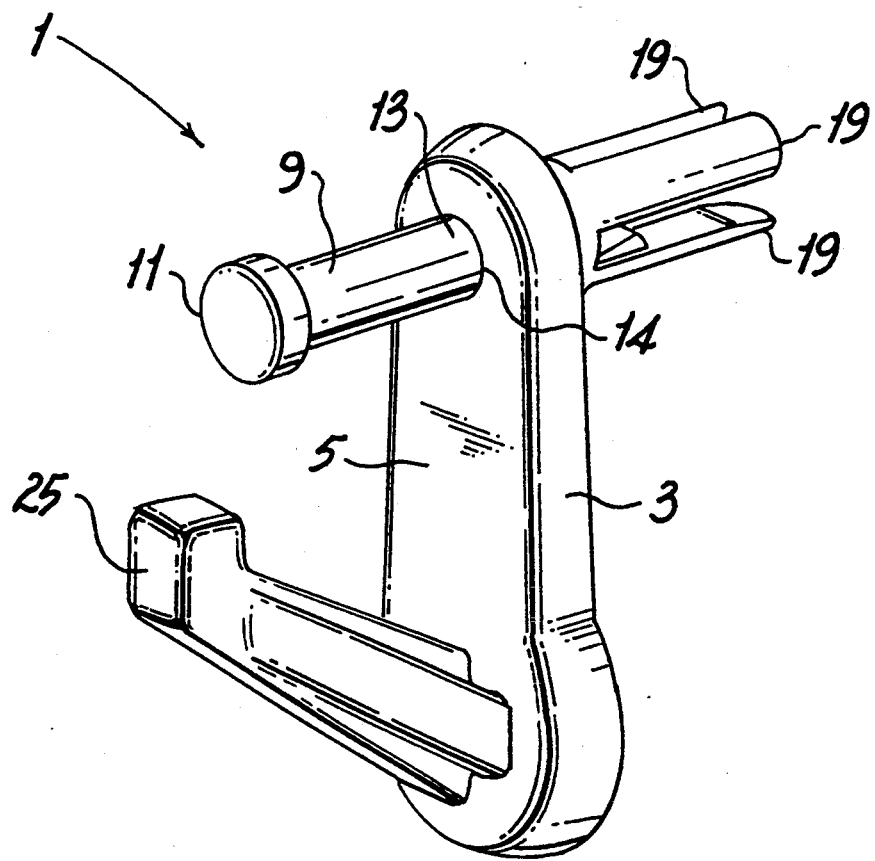
FIG. 1 of the drawings is a perspective view of a preferred embodiment of this invention.
Figure 2:
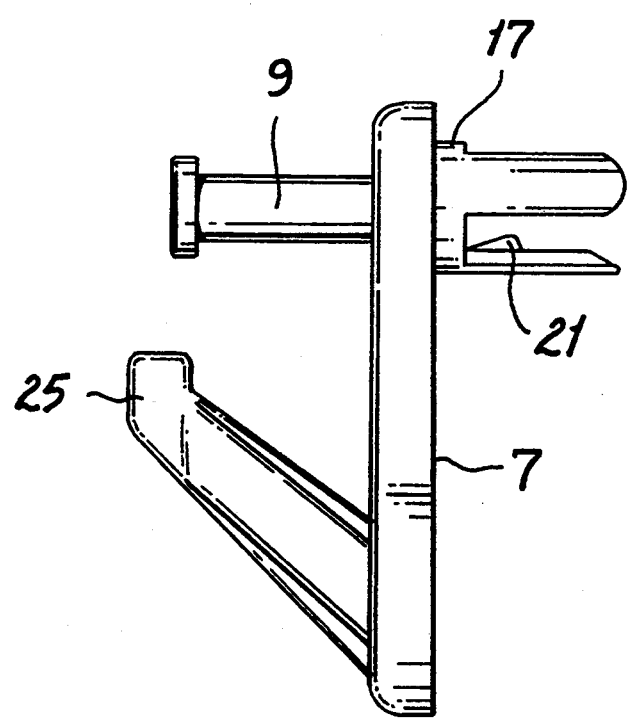
FIG. 2 of the drawings is a side elevation of the embodiment seen in FIG. 1.

As shown in FIGS. 1 and 2 of the preferred embodiment, an anchor apparatus 1 is illustrated having a platform 3 with a front surface 5 and a back surface 7. A plunger 9 having a head 11 is carried by front 5. As best seen in reference to FIG. 4, the first end 13 of plunger 9 is retained in opposite and axial alignment to a chamber seen as orifice 15 which traverses the platform 3. A portion of orifice 15 associated with plunger 9 is sealed with a small amount of sacrificial material 14 which holds plunger 9 in place.

Figure 3:
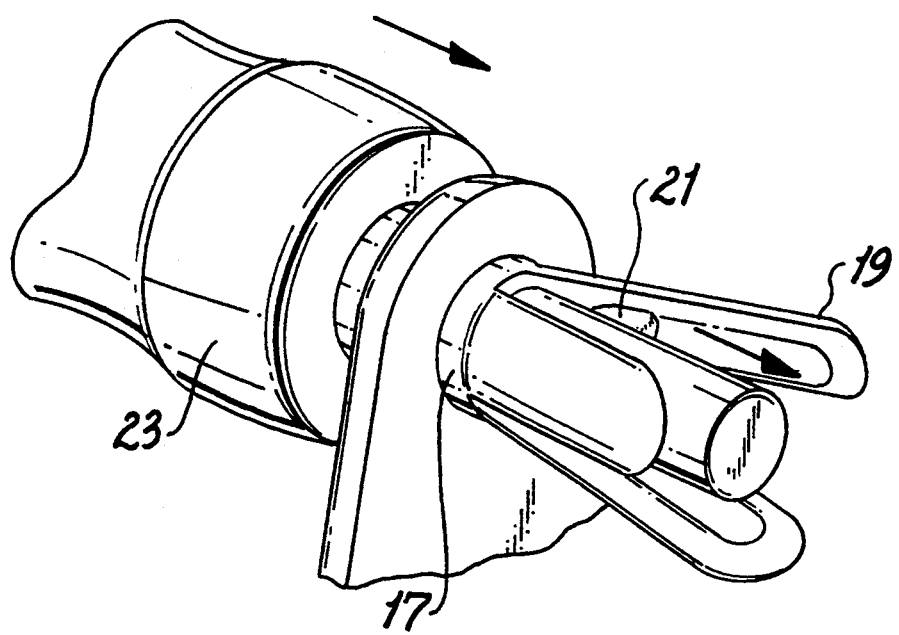
FIG. 3 of the drawings is a perspective view of winged projections being engaged by the plunger.
Figure 4:
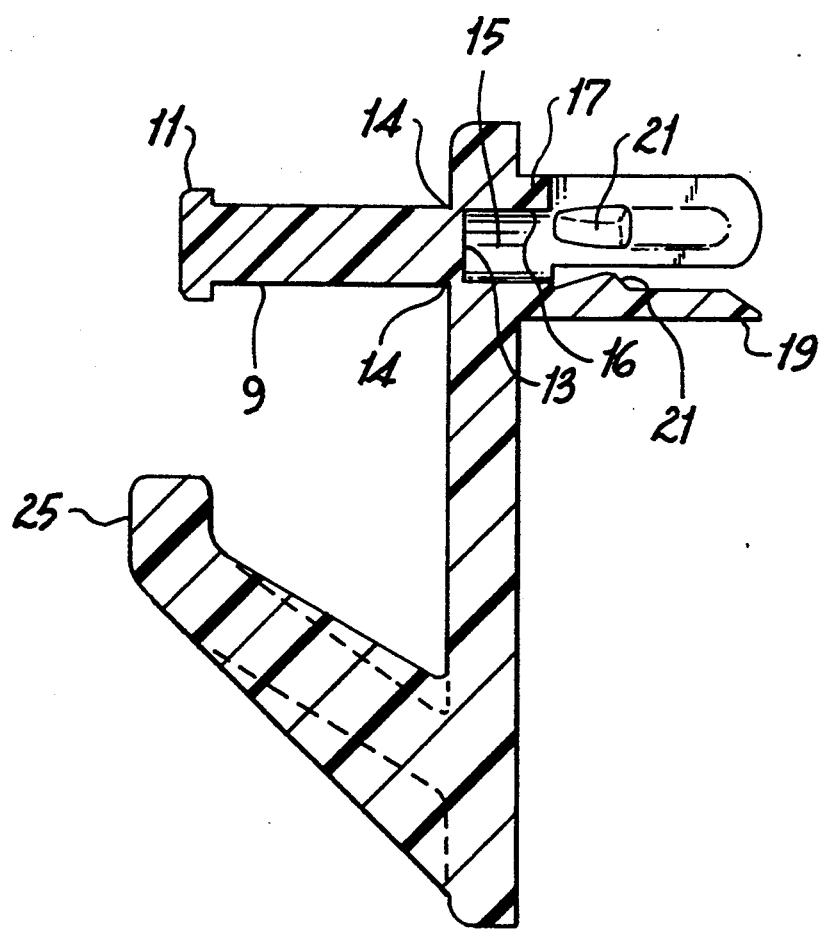
FIG. 4 of the drawings is a sectional of FIG. 2 with additional wing detail indicated in partial phantom.

As best seen in FIG. 2 and. FIG. 4, orifice 15 is surrounded by a collar 17, collar 17 carried by the platform back and collar 17 further defining an inner perimeter 16 which is in axial alignment with orifice 15. A plurality of wings 19 extend from collar 17 away from orifice 15 and in substantial alignment with an axis of orifice 15. Each wing 19 carries on its inner surface a projection 21 which extends into the axis defined by orifice 15. As seen in reference to FIG. 3, when a hammer 23 or similar engaging instrument strikes the head 11 of plunger 9, plunger 9 is released into orifice 15, passing through orifice 15 and engaging projections 21 on the inner surface of wings 19. The insertion of plunger 9 and the interaction with projections 21 force the wings 19 to project outward away from the inserted plunger. The resulting expansion of wings 19 provides a securing mechanism for retaining the wall anchor within the confines of a hollow wall.

Though not illustrated, it is readily understood and appreciated that wings 19 are inserted into a pilot hole of a hollow wall. When properly inserted, rear platform wall 7 is flush against the exterior wall surface. When the plunger is struck and activated as described above, the interaction of the plunger with the projection forces the wings to flare outward thereby wedging the wall anchor apparatus to the wall.

The preferred embodiment set forth above provides a strong anchoring or fastening means which is not readily reversible. Therefore, this particular embodiment is useful where a permanent fastener is desired or a tamper resistant fastener is sought.

While the preferred embodiments seen in FIGS. 1 through 4 provide a single wall hook 25 which is suitable for hanging pictures, etc., platform 3 can carry a wide variety of attachments and assume a myriad of configurations. For instance, platform 3 could be an integral portion of a cabinet shelving system, allowing the integral wall anchor to secure a cabinet to a hollow wall or function as a separate fastener in place of screws, nails, or rivets. Similarly, platform 3 could carry shelving brackets or define attachment means for detachable brackets as commonly used in shelving systems. Additional uses can include a linear platform defining a plurality of orifices and plungers such that platform 3 defines a vertical upright for use with shelving or other wall suspended structures.

Alternative uses for the present fastener include most existing applications for conventional fasteners such as nails, screws, bolts or rivets. The anchor can be used to fasten sheet metal components, fasten building components to studs or other supports, and can provide a fastener which is safe to use in proximity to electrical sources since the fastener can be provided in non-conductive materials.

Figure 5:
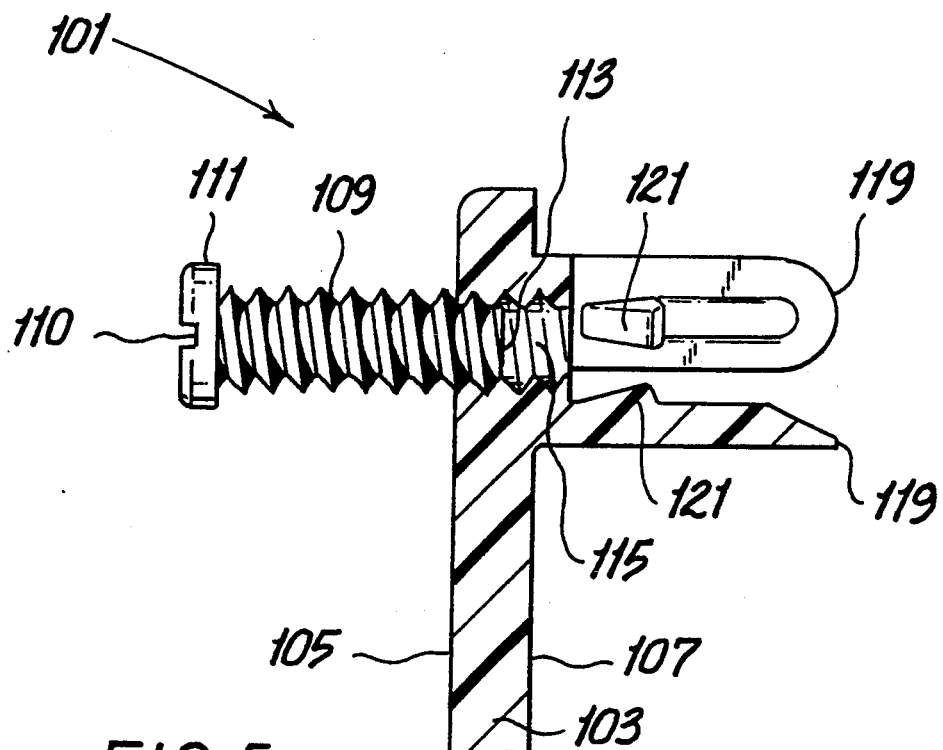
FIG. 5 of the drawings is a cross section similar to FIG. 4 of an alternative embodiment of the invention showing a threaded plunger.

As best seen in reference to FIG. 5, an alternative embodiment of the present invention is illustrated in which a wall anchor 101 has a platform 103 having a front 105 and a rear 107. Plunger 109 is threaded so as to mate with the orifice 115 which is designed to engage with threaded end 113 of plunger 109. Head 111 has a slot 110 which is designed to be engaged by a screwdriver. When plunger 109 is physically inserted through orifice 115, plunger end 113 engages wings 119 carried by a collar 117. Projections 121 on the interior surface of wings 119 engage plunger 109 and force wings 119 to flare outward in a fashion similar to that seen in FIG. 4.

The embodiment seen in reference to FIG. 5 can be provided as a unitary structure or can be furnished with the detachable plunger 109. The embodiment seen in FIG. 5 facilitates the removal of the wall anchor which may be desirable for certain applications. Platform 103 can be varied in shape, size, attachments and/or engaging means similar to the uses of the previously described embodiments.

While the preferred embodiments of the present invention are of plastic or rigid nylon, any moldable material including graphite, fiberglass, or polyethylene will suffice. An equivalent structure can be provided from other materials such as metal or wood, or could be constructed of components having different material makeups. For instance, platform 3 and wings 19 can be provided from nylon while plunger 9 is of metal.

As is apparent from the above description of the drawings, plunger 9 is retained by a small amount of sacrificial material 14 surrounding end 13 in proximity to the chamber 15. While FIG. 4 illustrates terminus 13 partially engaging chamber 15, the sacrificial material 14 supplies a surprisingly strong bond such that plunger 9, in a preferred embodiment, is held in proper position without entering chamber 15. The shaft of plunger 9 has complementary dimensions slightly smaller than the dimensions of chamber 15 thereby permitting the initial insertion and subsequent passage of plunger end 13 through the chamber.

As seen in FIG. 4, collar 17 has an inner perimeter 16 whose dimensions are substantially identical to chamber 15 so that chamber 15 and the inner surface of collar 17 define a continuous, uniformly shaped passageway. The length of collar 17 can be varied according to the wall thickness. A thicker wall material would require a collar having a greater length. The greater length is required to permit the wings to pass through and clear the wall so that the subsequent flaring of the wings is not impeded by the wall material surrounding the pilot hole.

The projections 21 on the surface of wings 19 can assume a variety of configurations. However, as illustrated, a preferred embodiment for projection 21 is a wedge-shaped structure, with the narrow point of the wedge directed toward the chamber/collar passageway. The height of each projection relative to the wing can control the degree of displacement of the wings.

The outward flare or flexing of wings 19 is further facilitated by the spacing from platform 3 which is provided by collar 17. This spacing or gap facilitates the flaring of wings 19 and subsequent engagement of wings 19 within a hollow structure.

The preferred molding material, such as plastic or nylon, should have sufficient shear strength to withstand reasonable weights and loads placed upon the platform and/or the attachments. In addition, the wing material should be flexible to permit the necessary projection or flaring of the wings when engaged by the plunger. Material such as nylon or plastic has been found to permit a unitary apparatus having the desired combination of desirable properties including strength, moldability and flexibility.

A separate detachable plunger can be provided which is inserted into the orifice prior to use. However, the embodiments described above are preferred because a unitary construction is more desirable since the steps of installation are greatly simplified.

The single piece construction also eliminates problems common with prior art separate "sleeve type" anchor which may be inserted improperly or placed in a wrong position. Once inserted, prior art sleeves are difficult to remove. Efforts to partially engage the prior art sleeves in order to remove the anchor results in greater wall damage and often results in too great a diameter hole which subsequently fails to be secured by the anchor. The present invention permits the wings 19 and collar 17 to be inserted into a pilot hole with an opportunity to verify flush positioning of the platform against the wall prior to securing the anchor within the confines of the wall.

While the above embodiments refer to a circular orifice and a correspondingly shaped plunger and collar, equivalent shapes are also possible. For instance, chamber 15 can be provided by a rectangular shaped shaft in which the corresponding plunger and collar are similarly shaped. In such an embodiment, wings 19 would be positioned about the collar so that projections 21 are impacted by the movement of the plunger.

While the above embodiments and written description are directed towards an anchor or an attachment means suitable for hollow or easily traversed walls or ceilings, the present invention is equally suitable for use within a solid structure such as brick, concrete, or wood. For solid structures, a pilot hole is provided which permits the snug insertion of the wings and collar of the anchor. Upon engagement of the plunger, the plunger is forced past the projections, expanding the wings within and against the pilot hole. Depending upon the nature of the solid material, the wings may partially spread in certain types of soft wood or compressed wood products or where a slightly oversized pilot hole is provided. Where the material or pilot hole size does not permit expansion, the plunger will often deform, permitting passage of the plunger past the projections. In either event, an extremely tight and secure frictional fit is obtained between the anchor and the solid material.

Figure 6:
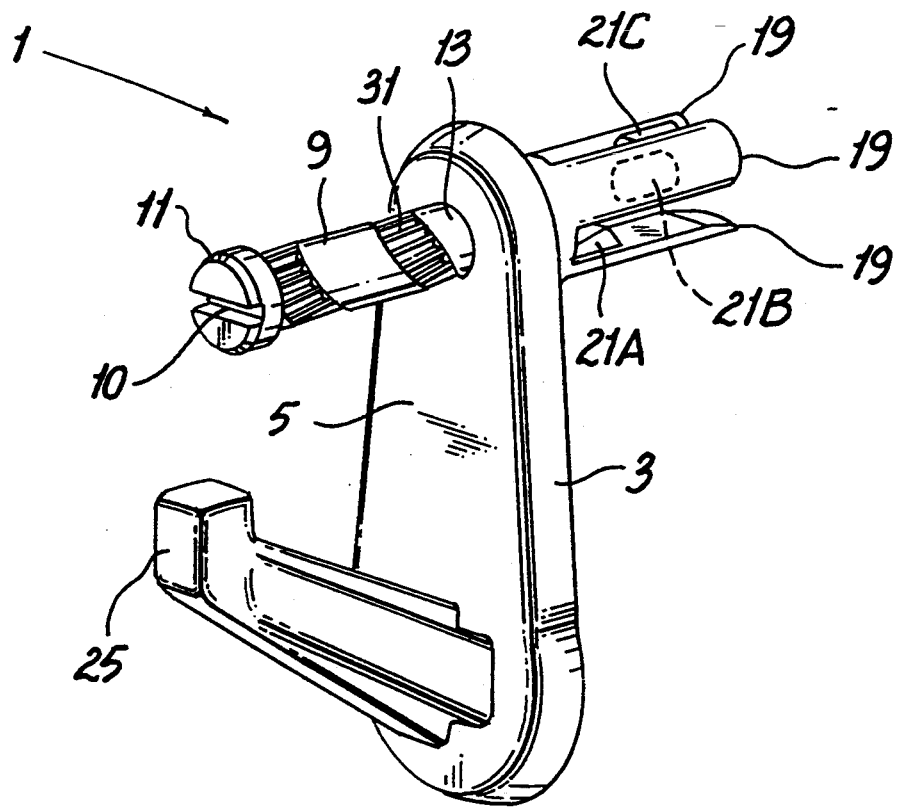
FIG. 6 of the drawings is a perspective view of an additional embodiment of this invention illustrating a grooved plunger.

An additional embodiment of the present invention is provided which facilitates the use of the anchor within the solid material. As seen in FIG. 6, a helical groove 31 can be provided by the surface of plunger 9. The free terminus of groove 31 is positioned so that projection 21a engages the groove terminus when plunger 9 is initially inserted into chamber 15. The pitch of the helical groove is selected to match the staggered spacing of projections 21a, 21b, and 21c which are carried by wings 19. When properly spaced, groove 31 sequentially engages projections 21a–21c thereby rotating plunger 9. The interaction between the groove and projections is similar to the action of a worm gear, with both rotational and longitudinal movement of the plunger being provided by the sequential interaction of properly positioned projections within the groove.

This embodiment facilitates the anchor's use in solid material. The gear-like meshing of the groove with the projections will expand the wings within the rigid confines of the pilot hole. In addition, distortion of the plunger material is greatly reduced by the precision tracking of the projections within groove 31. Further, the groove reduces the force needed to engage and insert the plunger through chamber 15.

If desired, a series of longitudinal grooves can be provided by each plunger in which each groove corresponds to a single projection 21. This arrangement would facilitate the insertion of the plunger when the anchor is used within solid material. However, no rotational force would be supplied to the plunger, limiting the ability of the plunger to be removed from the housing.

Also seen in FIG. 6 is a slot 10 which provides an engaging means for either the insertion or subsequent removal of the plunger. While slot 10 can be provided on any embodiment of the instant invention, the rotational feature of the current embodiment facilitates the insertion and subsequent removal of the plunger with a screwdriver. Equivalent plunger engagement means can be provided by head 11 defining an angled shape for engagement with a wrench.

It is thus seen that the present invention provides a securing apparatus which is equally useful for hollow supports as well as solid support structures. The anchoring apparatus can be provided by molding and injection molding techniques where a small quantity of sacrificial material provides a simple, pre-aligned plunger for engaging the securing wings of the apparatus. As many other variations may be apparent to one of skill in the art from reading the above specification, such variations are within the spirit and scope of this instant invention as defined by the following appended claims.

That which is claimed:

1. An anchor apparatus comprising:
   a platform having a front and back, said platform defining an orifice in communication with said platform back;
   a pre-aligned plunger having a substantially smooth, cylindrical surface and attached at a first end to said platform front, said first end in opposite alignment to said orifice;
   a utility device integral with said platform and extending from the front of said platform;
   a collar, said collar carried by said platform back, an inner circumference of said collar in axial alignment with said orifice;
   a plurality of elongate wings carried by said collar, each said wing further defining a discrete, inwardly extending projection along an inner wing surface and adjoining said collar;
   wherein, when said plunger is engaged, said plunger is inserted through said orifice and said collar, said free end of said plunger engaging said projections, thereby forcing said plurality of wings outward.

2. An apparatus as described in claim 1 wherein each of said projections is substantially wedge-shaped.

3. An apparatus as described in claim 1 wherein said plunger is attached to said platform by a frangible material.

4. An apparatus as described in claim 1 wherein said utility device is a hook.

5. An apparatus as described in claim 1 wherein said projections are substantially coplanar.

6. An anchor apparatus comprising:
   a platform having a front and back, said platform defining an orifice in communication with said platform back;
   a pre-aligned plunger attached at a first end to said platform front, said first end in opposite alignment to said orifice, said plunger further defining a spiral groove in an exterior surface;
   a utility device integral with said platform and extending from the front of said platform;
   a collar, said collar carried by said platform back, an inner circumference of said collar in axial alignment with said orifice;
   a plurality of wings carried by said collar, each said wing further defining a projection along an inner wing surface;
   said projections being in staggered relationship such that said groove in said plunger sequentially engages said projections as said plunger is urged through said orifice;
   wherein, when said plunger is engaged, said plunger is inserted through said orifice and said collar, said groove of said plunger engaging said projections, thereby exerting an expanding force upon said plurality of wings.

7. An apparatus as described in claim 6 wherein said plunger is attached to said platform front by a frangible material.

* * * * *